US012703617B2

(12) United States Patent
Iotti

(10) Patent No.: US 12,703,617 B2
(45) Date of Patent: Aug. 11, 2026

(54) ADJUSTABLE FORK FOR HEAVY LOADS

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 368 days.

(21) Appl. No.: 18/519,612

(22) Filed: Nov. 27, 2023

(65) Prior Publication Data

US 2024/0199396 A1 Jun. 20, 2024

(30) Foreign Application Priority Data

Dec. 20, 2022 (IT) ........................ 102022000026055

(51) Int. Cl.
*B66F 9/14* (2006.01)

(52) U.S. Cl.
CPC .................................... *B66F 9/143* (2013.01)

(58) Field of Classification Search
CPC .......... B66F 9/142; B66F 9/143; B66F 9/144; B66F 9/148
See application file for complete search history.

(56) References Cited

U.S. PATENT DOCUMENTS 2,788,148 A * 4/1957 Parcell .................... B66F 9/144 414/621
4,533,290 A * 8/1985 Hackauf ................. B66F 9/143 414/667
4,960,357 A * 10/1990 Laursen .................. B66F 9/142 414/667
5,052,882 A 10/1991 Blau et al.
5,096,363 A * 3/1992 Weinert .................. B66F 9/143 414/667
5,139,385 A * 8/1992 Chase ..................... B66F 9/144 414/667
5,190,436 A * 3/1993 Sorlie ..................... B66F 9/144 414/667
7,632,055 B2 * 12/2009 Foroni .................... B66F 9/142 414/667

(Continued)

FOREIGN PATENT DOCUMENTS

| | | |
|---|---|---|
| CN | 212532191 | 2/2021 |
| DE | 19943356 A1 | 5/2000 |
| DE | 202016008511 | 5/2018 |

OTHER PUBLICATIONS

Italian Search Report, issued on Jun. 26, 2023 in App. No. IT 202200026055, 6 pages.

*Primary Examiner* — Jonathan Snelting
(74) *Attorney, Agent, or Firm* — Chrisman Gallo Tochtrop LLC

(57) ABSTRACT

An adjustable fork that includes a main frame, a first and a second prong associated with the main frame, and a first slider and a second slider, associated with the main frame with the possibility of sliding along an adjustment direction (X) away from and towards each other for a predetermined adjustment stroke. The first prong is associated with the first slider with the possibility of sliding along the adjustment direction (X) for a predetermined adjustment stroke and the second prong is associated with the second slider with the possibility of sliding along the adjustment direction (X) for a predetermined adjustment stroke.

15 Claims, 4 Drawing Sheets

(56) References Cited

U.S. PATENT DOCUMENTS

| | | | | |
|---|---|---|---|---|
| 12,006,197 | B1 * | 6/2024 | Hamlik | B66F 9/18 |
| 12,221,332 | B2 * | 2/2025 | Cantrill | B66F 9/085 |
| 2008/0199292 | A1 * | 8/2008 | Gatteschi | B66F 9/143 414/607 |
| 2013/0177374 | A1 * | 7/2013 | Matti | B66F 9/12 414/667 |

* cited by examiner

ADJUSTABLE FORK FOR HEAVY LOADS

This invention relates to an adjustable fork, which is particularly suitable for supporting high loads, such as, for example, a container.

The term fork is used to denote a tool intended to be connected to the end of a motor arm and comprising a main frame with at least two prongs, connected to the main frame.

The main frame, besides supporting the prongs, is designed for being connected to the end of the motor arm. The main frame has a front portion, intended to face towards the load, from which the prongs project. As is known in the sector, the prongs are designed to be inserted under the load to be lifted. For that purpose, the prongs are configured substantially in the form of relatively flattened bars, which project in front of the main frame of the fork.

The forks currently available can be sized for supporting considerable loads, in the order of a few tens of tonnes, such as, for example, containers full of goods.

In many cases, the forks are provided with an adjustment system which allows the two prongs to be widened and moved towards each other in order to adapt to the dimensions of the load to be supported. Moreover, the adjustment system may be configured to allow a simultaneous lateral movement of the two prongs, in such a way as to correct laterally the position of the prongs relative to a desired loading position to be reached, without the need to activate or move the motor arm which supports the fork.

In the specific sector of loading, unloading and movement of the containers, typically 20-foot containers, a typical drawback is that of having to use two different machines, or the same telescopic machine but with two different forks, to perform the two operations of:

- accessing inside the container, through the side door which is on one of the two short sides, for filling and/or emptying the container;
- moving the entire container, either full or empty, using the pockets in which forks can be inserted from the two long sides.

In fact, the centre distance of these pockets for gripping the entire container is approximately 2050 mm, thereby requiring forks with a width of around 2500 mm. These widths prevent the fork from entering the container through the access door provided, the width of which is approximately 2340 mm.

In these cases, it is therefore necessary to use two different machines, or to interchange two forks at the end of the motor arm, with a considerable waste of time.

The aim of the invention is to provide an adjustable fork which overcomes the drawbacks of the forks currently available.

An advantage of the fork according to the invention is that it is able to perform both the above-mentioned operations, that is to say, loading a container and access inside a container, thus avoiding the need to use two different machines or having to replace the fork depending on the operation to be performed and also guaranteeing a complete travel stroke of the forks over the entire width of the load-bearing frame.

Another advantage of the fork according to the invention is that it can be activated substantially with the same commands necessary for operating the forks currently available, that is to say, without requiring the operator to control further commands relative to those necessary for controlling the forks currently available.

Further features and advantages of the invention are more apparent from the detailed description which follows of an embodiment of the invention, illustrated by way of a non-limiting example in the accompanying drawings in which.

Figure 1:
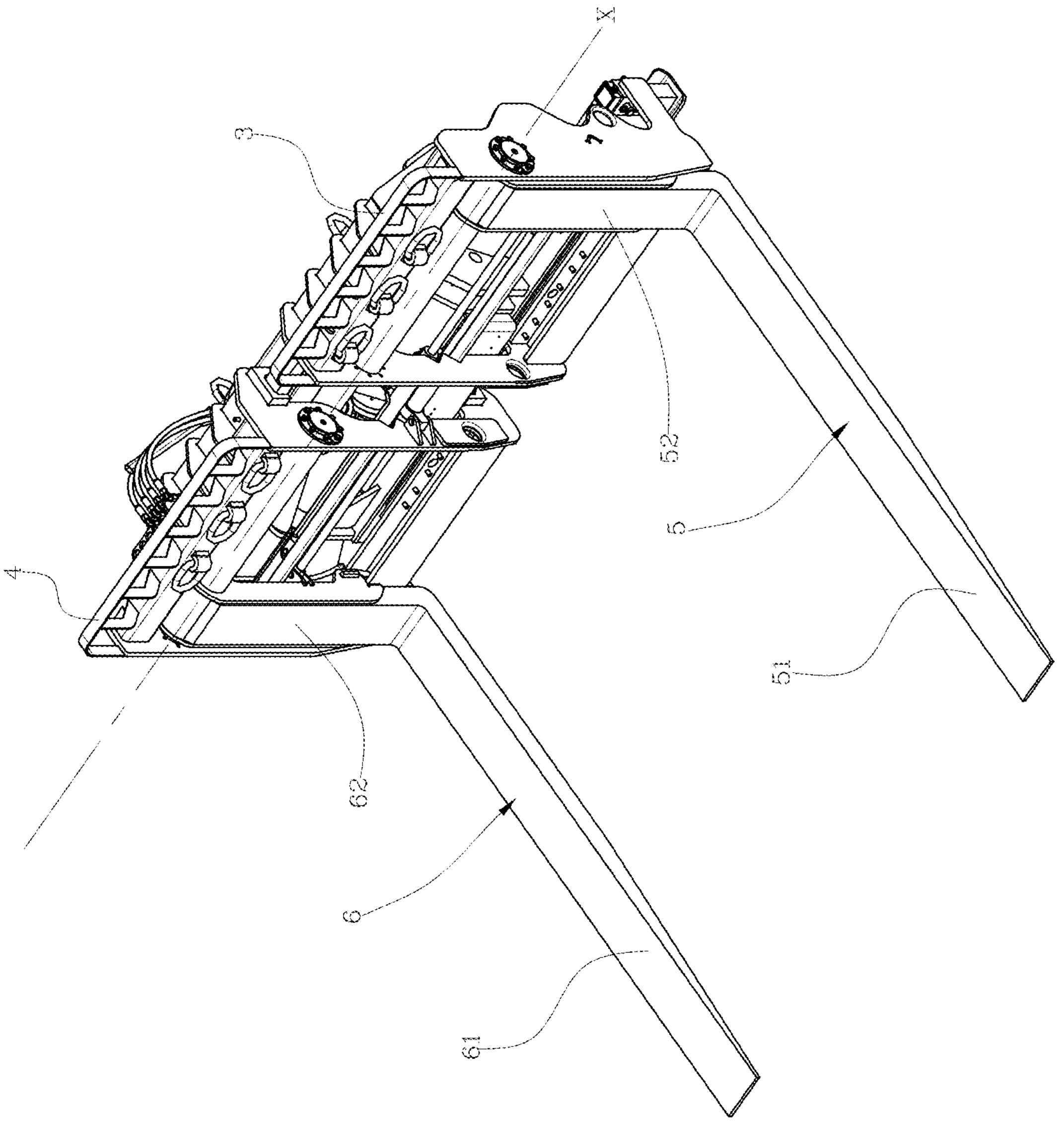
FIGS. 1 and 2 show isometric views from different angles of the fork according to the invention.
Figure 2:
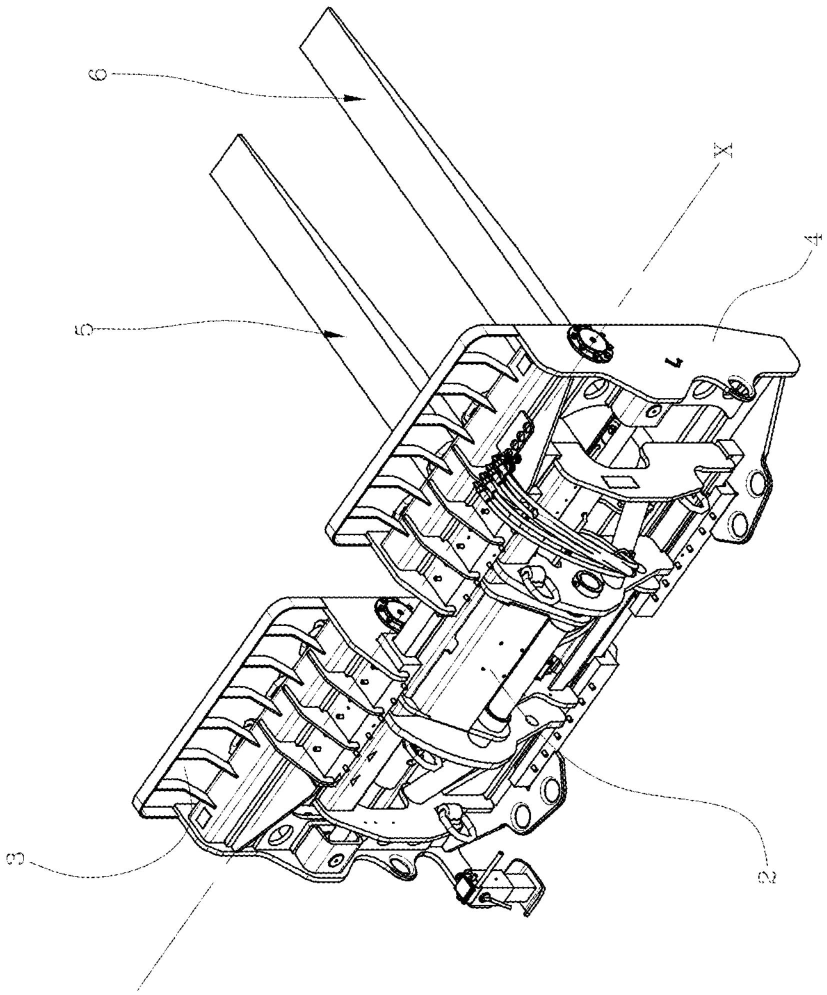
Figure 3:
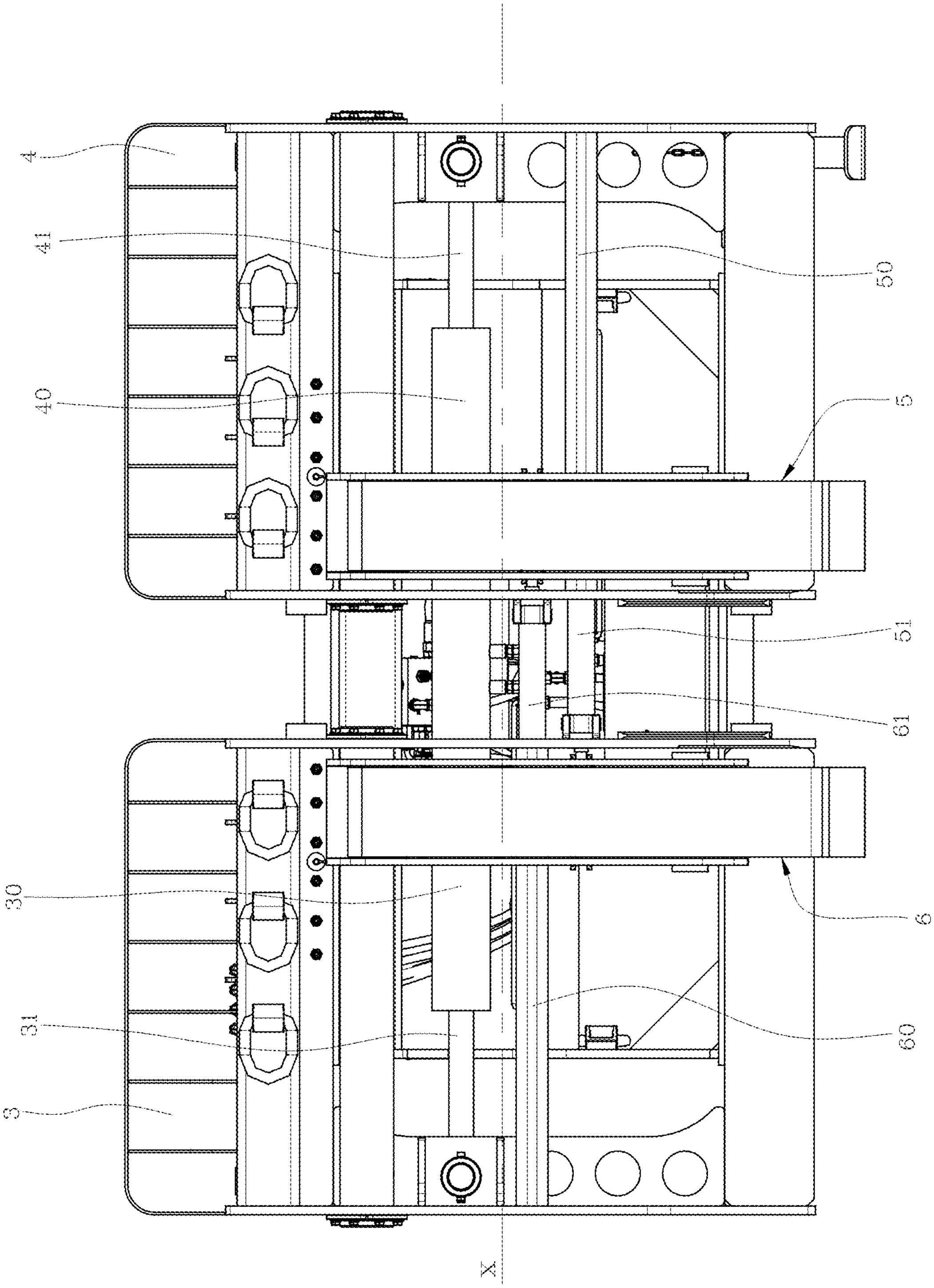
FIG. 3 shows a front view of the fork.
Figure 4:
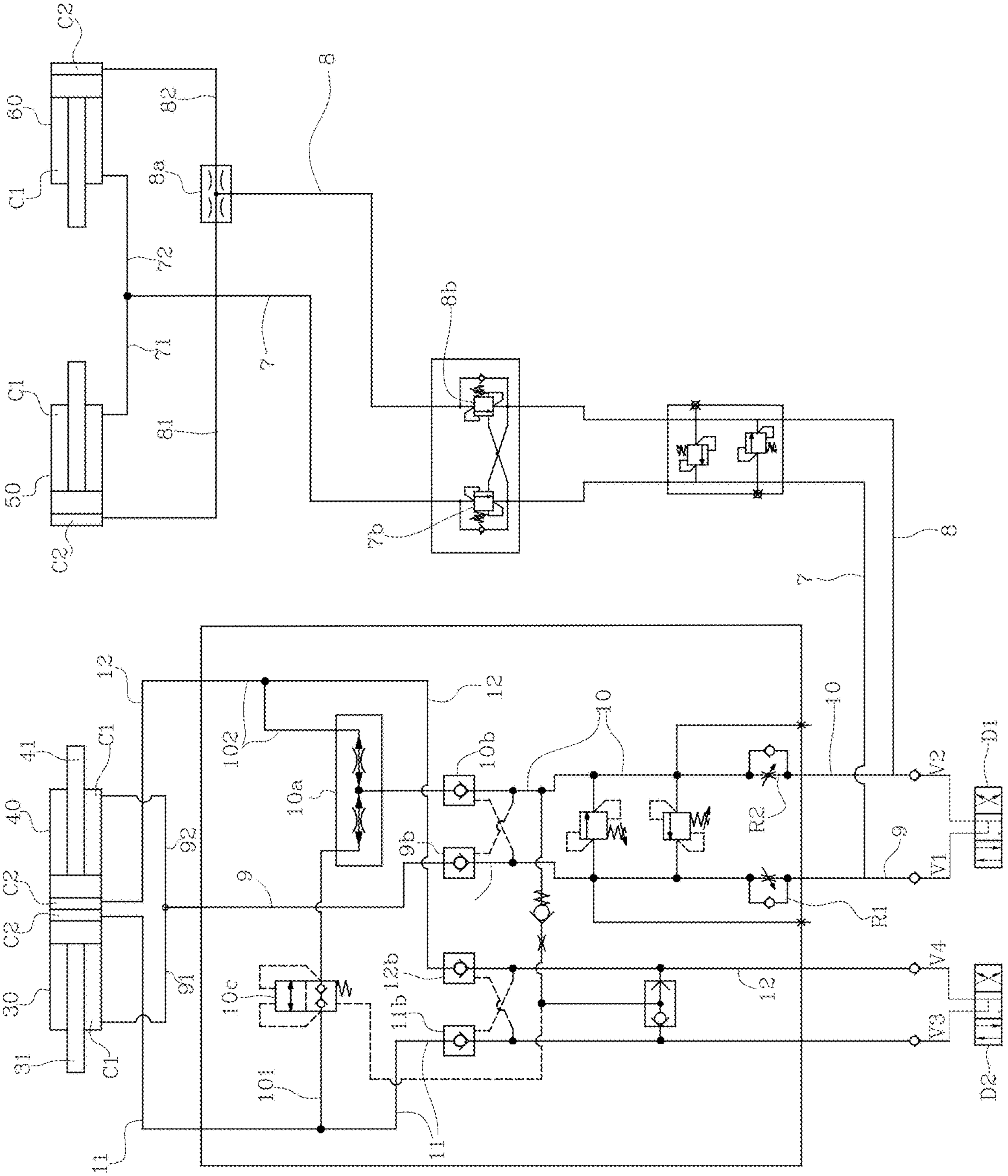
FIG. 4 shows a diagram of a hydraulic circuit for controlling the fork according to the invention.

The adjustable fork (1) according to the invention comprises a main frame (2), to which are associated a first and a second prong (5, 6).

The main frame (2) comprises a plurality of profiles and/or bars or other components, connected to each other in such a way as to form a stable structure. The main frame (2) is also designed for being connected to a vehicle or to the end of a movable arm, or other supporting part.

The first and the second prong (5, 6) are intended to be inserted beneath a load to be lifted, for example beneath a container or a pallet, as described in more detail below.

For this purpose, each prong comprises a relatively thin elongate portion (51, 61) which protrudes at the front of the main frame (2). Each elongate portion (51, 61) is connected to a coupling portion (52, 62), associated with the main frame (2).

The prongs (5, 6) are slidable relative to the main frame (2) along an adjustment direction (X). The adjustment direction (X) is substantially horizontal, with reference to the normal use of the fork.

Along the adjustment direction (X) it is possible to measure the overall width of the adjustable fork according to the invention. The overall width is substantially the distance, measured parallel to the adjustment direction (X), which separates the two parts or outermost surfaces of the fork.

The fork according to the invention comprises a first slider (3) and a second slider (4), associated with the main frame (2) with the possibility of sliding along an adjustment direction (X) away from and towards each other for a respective predetermined adjustment stroke. The adjustment stroke of each slider extends substantially between an inner limit position, positioned close to the opposite slider, and an outer limit position, opposite to the inner limit position.

In particular, the first and second sliders 3, 4 are movable between a minimum distance position, in which they are both in an inner limit position, and a maximum distance position, in which they are both in an outer limit position.

The first prong (5) is associated with the first slider (3) with the possibility of sliding, relative to the first slider (3), along the adjustment direction (X) for a predetermined adjustment stroke. The second prong (6) is associated with the second slider (4) with the possibility of sliding, relative to the second slider (4), along the adjustment direction (X) for a predetermined adjustment stroke. Also in the case of the prongs, each adjustment stroke extends substantially between an inner limit position, positioned close to the opposite prong, and an outer limit position, opposite to the inner limit position.

Thanks to the presence of the two sliders (3, 4), it is possible to move the fork to a configuration of minimum width, which can be obtained by moving the sliders (3, 4) to a minimum distance position. The configuration of minimum width may be sized, for example, to allow the passage through the door of a container. In particular, the configuration with a minimum width is sized in such a way that the overall width of the fork is less than the width of the door of a container. The dimensioning of the minimum configuration substantially depends on the width of the frame, the width of the sliders (3, 4) and the inner limit position of the latter.

Moreover, the stroke available for each prong (5, 6) on the respective slider (3, 4) allows, as required, a considerable increase in the overall width of the fork, for example to allow the support of a container at a long side. A further advantage provided by the stroke available for each prong (5, 6) on the respective slider (3, 4) is that it allows the prongs (5, 6) to perform a complete stroke over the entire width of the load-bearing frame, between a minimum distance position, wherein the prongs are at their inner limit position and are close together in a central zone of the load-bearing frame, and a maximum distance position, wherein the prongs are at their outer limit position and are positioned at the ends of the load-bearing frame.

In practice, the characteristics of the fork according to the invention, that is to say, the use of the two sliders (3, 4) and the prongs (5, 6) slidable on a respective slider, make it suitable both for access to the inside of a container, through the door intended for this, and for lifting and supporting a container, at a long side.

The fork according to the invention also comprises an actuator unit (30, 40, 50, 60), configured for producing the adjustment strokes of the first slider, the second slider, the first prong and the second prong. As described in more detail below, the actuator unit could be of a hydraulic type or of an electric type, or a combination of the two types.

A control system is connected to the actuator unit (30, 40, 50, 60). The control system is configured for activating the actuator unit in response to at least a widening command and to a narrowing command. Typically, the narrowing and widening commands are given by an operator, by means of an interface of known type, comprising, for example, levers and/or pushbuttons.

In the presence of an active widening command, the control system is designed to determine a mutual moving away of the prongs (5, 6) until each of them reaches its outer limit position, that is to say, until the prongs (5, 6) are in maximum distance position. After reaching the outer limit position of the prongs (5, 6), the control system determines a mutual moving away of the sliders (3, 4). The movements of the prongs and two sliders cease when the widening command is deactivated. In other words, the control system activates the movement firstly of the prongs, then of the sliders, in the sequence described above, only if the widening command is active, that is to say, only in a condition wherein the operator keeps the widening command active. In that case, the movements of the prongs and of the sliders occur in the sequence described above, without the need, for the operator, to distinguish between a widening command for the prongs and a widening command for the sliders.

In the presence of an active narrowing command, the control system determines a moving of the prongs (5, 6) towards each other up to a minimum distance position, followed by a moving towards each other of the sliders (3, 4). Also in the case of a narrowing command, the movements of the prongs and of the sliders occur in the sequence described above, without the need for the operator to distinguish between a narrowing command for the prongs and a narrowing command for the sliders.

The control system is also configured for activating the actuator unit in response to a first lateral movement command and to a second lateral movement command.

In the presence of the first lateral movement command, the control system is configured for determining a simultaneous movement of the sliders (3, 4) in a first direction along the adjustment direction (X).

In the presence of the second lateral movement command, the control system is configured for determining a simultaneous movement of the sliders (3, 4) in a second direction, opposite the first direction along the adjustment direction (X).

The simultaneous movement of the sliders (3, 4) substantially allows the two prongs (5, 6) to move integrally along the adjustment direction (X).

According to the preferred but non-exclusive embodiment illustrated, the actuator unit comprises:

- a first actuator (30), connected to the first slider (3) and designed for determining the adjustment stroke of the first slider (3);
- a second actuator (40), connected to the second slider (4) and designed for determining the adjustment stroke of the second slider (4);
- a third actuator (50), connected to the first prong (5) and designed for determining the adjustment stroke of the first prong (5);
- a fourth actuator (60), connected to the second prong (6) and designed for determining the adjustment stroke of the second prong (6).

The actuators are preferably hydraulic actuators, in particular hydraulic cylinders. Alternatively, the actuators could be electric actuators.

The control system is connected to said actuators (30, 40, 50, 60) and is configured for activating each actuator in response to said widening and narrowing commands, and to said lateral movement commands.

According to the embodiment illustrated, in which the actuators (30, 40, 50, 60) are hydraulic actuators, the control system comprises a hydraulic control circuit. According to this embodiment, the actuators 30, 40, 50, 60 are hydraulic cylinders. Each of them comprises a first chamber (C1) and a second chamber (C2), separated from each other by a piston (P). The pistons (P) of the first and second actuators (30, 40) are connected by a kinematic mechanism, by means of a rod, to a respective slider (3, 4). The pistons (P) of the third and fourth actuators (50, 60) are connected by a kinematic mechanism, using a rod, to a respective prong (5, 6). The supplying of pressurised operating fluid to the first chambers (C1) or (C2) of the actuators (30, 40, 50, 60) determines a corresponding movement of the respective piston, and the consequent actuation of an adjustment stroke in one direction or the other.

The hydraulic control circuit comprises a first coupling opening (V1) and a second coupling opening (V2). The coupling openings (V1, V2) are intended to be connected with a source of pressurised fluid, for example a pump, or with a discharge. The connection of the coupling openings (V1, V2) is defined by a first distributor (D1), which can be connected to the first and second coupling opening (V1, V2).

The first distributor (D1) may adopt the following three positions:

- a first position, in which it connects the first coupling opening (V1) with a source of pressurised fluid and the second coupling opening (V2) with a discharge;
- a second position, in which it connects the first coupling opening (V1) with the discharge and the second coupling opening (V2) with the source of pressurised fluid;
- a central position, in which neither of the two connecting openings is connected to the source of pressurised fluid.

The position of the first distributor (D1) is determined by the operator by means of specific operating means. As described in more detail below, by actuating the first distributor (D1) the operator can impart the above-mentioned widening and narrowing commands.

The hydraulic control circuit comprises a first supply line (7), which connects the first chamber (C1) of the third and fourth actuators (50, 60) with the first coupling opening (V1). The supplying of operating fluid to the first line (7) causes an increase in the volume of the first chamber (C1) of the third and fourth actuators (50, 60), and a consequent movement of the piston (P). The movement of the piston (P) determines a narrowing of the prongs (5, 6). In that case, the supplying of the operating fluid to the first line 7 corresponds to the narrowing command of the prongs 5, 6. Preferably, the first line (7) has a fork into two branches (71, 72), respectively connected to the third and to the fourth actuators (50, 60). The flow rate of operating fluid received from the two branches (71, 72) is balanced by means of a divider (8*a*) which will be described in more detail below.

The hydraulic control circuit also comprises a second supply line (8), which connects the second chamber (C2) of the third and fourth actuators (50, 60) with a second coupling opening (V2). The supplying of operating fluid to the second line (8) determines an increase in the volume of the second chamber (C2) of the third and the fourth actuators (50, 60), and a consequent movement of the piston (P) opposite to that determined by the supplying to the first line (7). The movement of the piston (P) determines a widening of the prongs (5, 6). The supplying of operating fluid to the second line (8) corresponds to the widening command of the prongs (5, 6). Preferably, the second line (8) has a fork into two branches (81, 82), respectively connected to the third and the fourth actuators (50, 60). The flow rate of operating fluid received from the two branches (81, 82) is balanced by means of a divider (8*a*) known in the sector. The divider (8*a*) operates both on the flows received from the two branches (81, 82) of the second line (8), and indirectly on the branches (71, 72) of the first line (7). This is because the flow rates which are discharged from the first chambers (C1) are necessarily equivalent to the flow rates which are supplied to the second chambers (C2).

The hydraulic control circuit also comprises a third supply line (9), which connects the first chamber (C1) of the first and second actuators (30, 40) with the first coupling opening (V1). The supplying of operating fluid to the third line (9) determines an increase in the volume of the first chamber (C1) of the first and second actuators (30, 40), and a consequent movement of the piston (P). The movement of the piston (P) determines a narrowing of the sliders (3, 4). In that case, the supplying of operating fluid to the third line (9) corresponds to the narrowing command of the sliders (3, 4). Preferably, the third line (9) has a fork into two branches (91, 92), respectively connected to the first and the second actuators (30, 40). The flow rate of fluid received from the two branches 91, 92 is balanced by means of a divider (10*a*), the effect of which is described in more detail below.

The hydraulic control circuit comprises a fourth supply line (10), which connects the second chamber (C2) of the first and second actuators (30, 40) with said second coupling opening (V2). The supplying of operating fluid to the fourth line (10) determines an increase in the volume of the second chamber (C2) of the first and second actuators (30, 40), and a consequent movement of the piston (P) opposite to that determined by the supplying to the third line (9). The movement of the piston (P) determines a widening of the sliders (3, 4). The supplying of operating fluid to the third line (9) therefore corresponds to the command for widening the sliders (3, 4). Preferably, the fourth line (10) has a fork into two branches (101, 102), respectively connected to the first and the second actuators (30, 40). The flow rate of operating fluid received from the two branches (101, 102) is balanced by means of a divider (10*a*) known in the sector. The divider (10*a*) operates both on the flows received from the two branches (101, 102) of the fourth line (10), and indirectly on the branches (91, 92) of the third line (9). This is because the flow rates which are discharged from the first chambers (C1) are necessarily equivalent to the flow rates which are supplied to the second chambers (C2).

As already indicated, the first distributor (D1), in the first position, places in communication the first coupling opening (V1) with the source of pressurised fluid and the second coupling opening (V2) with the discharge. In these conditions, the pressurised fluid is directed both towards the first line (7) and the third line (9).

The hydraulic control circuit comprises sequence means which, with the distributor (D) in the first position, are designed to direct the pressurised fluid to the first line (7) until reaching a switching pressure and, subsequently, to direct the pressurised fluid to the third line (9). In this way, the movement of the first distributor (D1) to the first position determines firstly the supply of operating fluid to the first chambers (C1) of the third and fourth actuators (50, 60), and the consequent movement of the prongs (5, 6) towards each other. When the switching pressure is reached, the operating fluid is supplied to the third line (9), that is to say, to the first chambers of the first and second actuators (30, 40), determining the moving towards each other of the sliders (3, 4).

With the first distributor (D1) in the second position, the sequence means are set up to direct the pressurised fluid to the second line (8) until reaching a second switching pressure and, subsequently, to direct the pressurised fluid to the fourth line (10). In this way, the movement of the first distributor (D1) to the second position determines firstly the supply of operating fluid to the second chambers (C2) of the third and fourth actuators (50, 60), and the consequent movement of the prongs (5, 6) away from each other. When the switching pressure is reached, the operating fluid is supplied to the fourth line (10), that is to say, to the second chambers (C2) of the first and second actuators (30, 40), determining the moving away each other of the sliders (3, 4).

According to a first embodiment of the hydraulic control circuit, the switching pressure depends substantially on the masses of the prongs (5, 6) and of the sliders (3, 4) which are very different to each other. In practice, each prong (5, 6) has a weight considerably less than that of the respective slider (3, 4). That means that the operating fluid, supplied to the first coupling opening (V1), naturally flows towards the first line (7), since it encounters less resistance due to the smaller mass of the prongs (5, 6) compared with the sliders (3, 4). When the prongs (5, 6) reach the respective inner limit positions, the pressure in the first line (7) starts to rise until reaching the switching pressure, and after exceeding this the operating fluid supplies the third line (9). The switching pressure is substantially the pressure sufficient to allow the movement of the sliders (3, 4), that is to say, the pressure which can exert on the piston (P) of the actuators (30, 40) a thrust sufficient to put the respective slider (3, 4) in motion towards the inner limit position.

In the same way, the operating fluid supplied to the second coupling opening (V2) flows naturally towards the second line (8). When the prongs (5, 6) reach the respective outer limit positions, the pressure in the second line (8) starts to rise until reaching the switching pressure, and after exceeding this the operating fluid supplies the fourth line (10). Also in this case, the switching pressure is substantially the pressure sufficient to allow the movement of the sliders (3, 4), that is to say, the pressure which can exert on the piston (P) of the actuators (30, 40) a thrust sufficient to put the respective slider (3, 4) in motion towards the outer limit position. According to this first embodiment, the sequence means are substantially defined by the ratios between the masses of the prongs and of the respective sliders.

According to a second embodiment, the hydraulic control circuit comprises a first regulator (R1) and a second regulator (R2), positioned, respectively, along the third line (9) and along the fourth line (10). The two regulators (R1, R2) are configured to prevent or limit the flow along the third and the fourth lines (9, 10) if the pressure of the operating fluid, respectively at the first coupling opening (V1) or at the second coupling opening (V2) relative to the position of the first distributor (D1), is less than the switching pressure, and to allow the flow if the pressure of the operating fluid is greater than the switching pressure. The two regulators (R1, R2) may be fixed or able to be calibrated. The operating modes of this second embodiment are the same as those described for the first embodiment, with the difference that the switching pressure is determined by the regulators (R1, R2).

In the central position of the first distributor (D1), neither of the coupling openings (V1, V2) is connected to the source of operating fluid. In this condition, the first and second actuators (30, 40) are inactive and the sliders (3, 4) are consequently stationary. In order to keep substantially locked the first and the second actuators (30, 40) in the absence of a widening or narrowing command, that is to say, when the first distributor (D1) is in a central position, the third line (9) and the fourth line (10) are provided with a respective stop valve (**9*b*, 10*b*), known in the sector. The stop valves (9*b*, 10*b*) are controlled in crossed opening, that is to say, they are valves which are normally closed which are controlled during opening by the pressure present in the opposite line. In practice, the stop valve (9*b*) of the third line (9) is controlled during opening by the pressure present in the fourth line (10), whilst the stop valve (10*b*) of the fourth line (10) is controlled during opening by the pressure present in the third line (9). In this way, when the operating fluid is supplied to the fourth line (10), the stop valve (9*b*) of the third line (9) is activated for opening, allowing the discharge of the operating fluid coming from the first chambers (C1) of the first actuator (30) and of the second actuator (40) along the third line (9). Vice versa, when the operating fluid is supplied to the third line (9), the stop valve (10*b*) of the fourth line (10) is controlled during opening, allowing the discharge of the operating fluid coming from the second chambers (C2) of the first actuator (30) and of the second actuator (40) along the fourth line (10**).

In the same way, the first line (7) and the second line (8) are also provided with respective stop valves (**7*b*, 8*b*). The stop valves (7*b*, 8*b*) are also controlled in crossed opening, that is to say, they are valves which are normally closed which are controlled during opening by the pressure present in the opposite line. In practice, the stop valve (7*b*) of the first line (7) is controlled during opening by the pressure present in the second line (8), whilst the stop valve (8*b*) of the second line (8) is controlled during opening by the pressure present in the first line (7**).

The hydraulic control circuit also comprises a fifth supply line (11), connecting the second chamber (C2) of the first actuator (30) with a third coupling opening (V3), and a sixth line (12), connecting the second chamber (C2) of the second actuator (40) with a fourth coupling opening (V4).

The third and the fourth coupling openings (V3, V4) are intended to be connected to a source of pressurised fluid, for example a pump, or with a discharge. The connection of the coupling openings (V3, V4) to the pump or to the discharge is defined by a second distributor (D2), which can be connected to the third and to the fourth coupling openings (V3, V4).

The second distributor (D2) may adopt the following three positions:

- a first position, in which it connects the third coupling opening (V3) with a source of pressurised fluid and the fourth coupling opening (V4) with a discharge;
- a second position, in which it connects the third coupling opening (V3) with the discharge and the fourth coupling opening (V4) with the source of pressurised fluid;
- a central position, in which neither of the two connecting openings (V3, V4) is connected to the source of pressurised fluid.

The hydraulic control circuit also comprises a recirculation duct (91, 92), which connects the first chamber (C1) of the first actuator (30) with the first chamber (C1) of the second actuator (40). The recirculation duct (91, 92) is formed preferably by the two branches of the third line (9). As described in more detail below, when the operating fluid flows along the recirculation duct (91, 92) from the first chamber (C1) of the first actuator (30) to the first chamber (C1) of the second actuator (40), a stop valve (**9*b*) prevents the fluid from flowing along the third line (9) towards the first coupling opening (V1**).

The first position of the second distributor (D2) determines the supplying of operating fluid to the fifth line (11). The supplying of operating fluid to the fifth line (11) determines an increase in the volume of the second chamber (C2) of the first actuator (30), and a consequent movement of the piston (P), towards the left in the accompanying drawings. The movement of the piston (P) determines a reduction in the volume of the first chamber (C1) of the first actuator (30), which expels the operating fluid towards the recirculation duct (91, 92). The operating fluid is supplied to the first chamber (C1) of the second actuator (40) through the recirculation duct (91, 92). As a result, the volume of the first chamber (C1) of the second actuator (40) increases, thereby causing the piston (P) to move to the left in the accompanying drawings. The fluid contained in the second chamber (C2) of the second actuator (40) flows to the outlet along the sixth line (12). The two pistons (P) of the first and the second actuators (30, 40) therefore move in the same direction (left in the accompanying drawings), determining a concordant movement of the sliders (3, 4). The actuation of the second distributor (D2) in the first position therefore corresponds to a first command of lateral movement.

The second position of the second distributor (D2) determines the supplying of operating fluid to the sixth line (12). The supplying of operating fluid to the sixth line (12) causes an increase in the volume of the second chamber (C2) of the second actuator (40), and a consequent movement of the piston (P) towards the right, in the drawing, opposite to that determined by the supplying to the fifth line (11). The movement of the piston (P) determines a reduction in the volume of the first chamber (C1) of the second actuator (40), which expels the operating fluid towards the recirculation duct (91, 92). The operating fluid is supplied to the first chamber (C1) of the first actuator (30) through the recirculation duct (91, 92). As a result, the volume of the first chamber (C1) of the first actuator (30) increases, thereby causing the piston (P) to move to the right in the accompanying drawings. The fluid contained in the second chamber (C2) of the first actuator (30) flows to the outlet along the sixth line (11). The two pistons (P) of the first and the second actuators (30, 40) therefore move in the same direction (right in the accompanying drawings), determining a concordant movement of the sliders (3, 4). The actuation of the second distributor (D2) in the second position therefore corresponds to a second command of lateral movement.

In the central position of the second distributor (D2), neither of the coupling openings (V3, V4) is connected to the source of operating fluid. In this condition, the first and second actuators (30, 40) are inactive and the sliders (3, 4) are consequently stationary. In order to keep substantially locked the first and the second actuators (30, 40) in the absence of a lateral movement command, that is to say, when the second distributor (D2) is in a central position, the fifth line (11) and the sixth line (12) are provided with a respective stop valve (11*b*, 12*b*), known in the sector. The stop valves (11*b*, 12*b*) are controlled in crossed opening, that is to say, they are valves which are normally closed which are controlled during opening by the pressure present in the opposite line. Basically, the stop valve (11*b*) of the fifth line (11) is controlled during opening by the pressure present in the sixth line (12). In this way, when the operating fluid is supplied to the sixth line (12), the stop valve (11*b*) of the fifth line (11) activates for opening, allowing discharge of the operating fluid coming from the second chamber (C2) of the first actuator (30) along the fifth line (11). Vice versa, when the operating fluid is supplied to the fifth line (11), the stop valve (12*b*) of the sixth line (12) is controlled during opening, allowing the discharge of the operating fluid coming from the second chamber (C2) of the second actuator (40) along the sixth line (12).

According to the embodiment illustrated, a first branch (101) of the fourth line (11) comprises an enabling valve (10*c*), movable between an open position, in which it allows the flow along the first branch (101), and a closed position, in which it prevents the flow along the first branch (101).

The enabling valve (10*c*) is normally closed and is also activated in the closed position by the pressure present in what is connected to the source of pressurised fluid between the fifth line (11) and the sixth line (12), whilst it is activated in the open position by the pressure present in the first branch (101). In this way, whether the pressurised fluid is supplied to the fifth line (11) or it is supplied to the sixth line (12), the enabling valve (10*c*) remains closed, preventing the recirculation of fluid between the fifth and the sixth lines (11, 12). When, on the other hand, the pressurised fluid is supplied to the fourth line (10), the enabling valve (10*c*) is controlled during opening by the pressure present along the first branch (101), allowing the flow towards the second chamber (C2) of the first actuator (30). Similarly, when the pressurised fluid is supplied to the third line (9) the enabling valve (10*c*) is controlled during opening, to allow the discharge of the fluid from the second chamber (C2) of the first actuator (30).

According to the preferred but non-exclusive embodiment illustrated, the first and second actuators (30, 40) are aligned with each other and connected at one end from the side of the respective first chambers (C1), with the rods (31, 41) facing on opposite sides. In other words, the first and the second actuators (30, 40) are connected to each other at the base, that is, at the blind end. This configuration allows the overall dimensions of the actuator unit to be reduced.

The first and the second actuators (30, 40) are also connected to the main frame (2). The rod (31) of the first actuator (30) is connected to the first slider (3). The rod (41) of the second actuator (40) is connected to the second slider (4).

According to the preferred but non-exclusive embodiment illustrated, the third actuator (50) is interposed between the second curser (4) and the first prong (5). In particular, the base of the third actuator (50) is connected to a side wall of the second slider (4), whilst the rod is associated with the first prong (5).

The fourth actuator (60) is interposed between the first slider (3) and the second prong (5). In particular, the base of the fourth actuator (60) is connected to a side wall of the first slider (3), whilst the rod is associated with the second prong (6).

The arrangement described above makes it possible to use fully the stroke available for the rods of the third and fourth actuators (50, 60).

The invention claimed is:

1. An adjustable fork, comprising:
- a main frame (2);
- a first and a second prong (5, 6), associated with the main frame (2);
- a first slider (3) and a second slider (4), associated with the main frame (2);
- the first slider (3) is slidable along an adjustment direction (X) away from and towards the second slider (4) for a predetermined adjustment stroke of the first slider (3);
- the second slider (4) is slidable along the adjustment direction (X) away from and towards the first slider (3) for a predetermined adjustment stroke of the second slider (4);
- the first prong (5) is associated with the first slider (3) and is slidable, relative to the first slider (3), along the adjustment direction (X) for a predetermined adjustment stroke of the first prong (5);
- the second prong (6) is associated with the second slider (4) and is slidable, relative to the second slider (4), along the adjustment direction (X) for a predetermined adjustment stroke of the second prong (6);
- wherein a configuration of minimum width is obtained when the sliders (3, 4) are moved towards each other to a minimum distance position of the sliders (3, 4);
- wherein the configuration of minimum width is not dependent on a position of the prongs (5, 6), such that the configuration of minimum width is obtainable when the prongs (5, 6) are in a minimum distance position of the prongs (5, 6), and when the prongs (5, 6) are in a maximum distance position of the prongs (5, 6).

2. The adjustable fork according to claim 1, comprising:
- an actuator unit (30, 40, 50, 60), designed for determining said adjustment strokes of the first slider, the second slider, the first prong and the second prong;
- a control system, connected to the actuator unit (30, 40, 50, 60) and configured for activating the actuator unit in response to at least one widening command and to a narrowing command;
- wherein in a presence of an active widening command, the control system determines a moving of the prongs (5, 6) away from each other up to the maximum distance position of the prongs (5, 6), followed by a moving away from each other of the sliders (3, 4);
- wherein in a presence of an active narrowing command, the control system determines a moving of the prongs (5, 6) towards each other up to the minimum distance position of the prongs (5, 6), followed by a moving towards each other of the sliders (3, 4).

3. The adjustable fork according to claim 2, wherein:
- the control system is configured for activating the actuator unit in response to at least a first lateral movement command and to a second lateral movement command;
- the first lateral movement command determines a simultaneous movement of the sliders (3, 4) in a first direction along the adjustment direction (X);

the second lateral movement command determines a simultaneous movement of the sliders (3, 4) in a second direction, opposite to the first direction, along the adjustment direction (X).

4. The adjustable fork according to claim 2, comprising:

a first actuator (30), connected to the first slider (3) and designed for determining the adjustment stroke of the first slider (3);

a second actuator (40), connected to the second slider (4) and designed for determining the adjustment stroke of the second slider (4);

a third actuator (50), connected to the first prong (5) and designed for determining the adjustment stroke of the first prong (5);

a fourth actuator (60), connected to the second prong (6) and designed for determining the adjustment stroke of the second prong (6);

wherein the control system is connected to said actuators (30, 40, 50, 60) and is configured for activating each actuator in response to said widening and narrowing commands.

5. The adjustable fork according to claim 4, wherein said actuators (30, 40, 50, 60) are hydraulic actuators, and wherein the control system comprises a hydraulic circuit.

6. The adjustable fork according to claim 5, wherein said actuators (30, 40, 50, 60) each comprise a first chamber (C1) and a second chamber (C2), separated from each other by a piston (P), and wherein the control system comprises:

a first supply line (7), which connects the first chamber (C1) of the third and fourth actuators (50, 60) with a first coupling opening (V1);

a second supply line (8), which connects the second chamber (C2) of the third and fourth actuators (50, 60) with a second coupling opening (V2);

a third supply line (9), which connects the first chamber (C1) of the first and second actuators (30, 40) with said first coupling opening (V1);

a fourth supply line (10), which connects the first chamber (C1) of the first and second actuators (30, 40) with said second coupling opening (V2);

a first distributor (D1), connected to the first and second coupling openings (V1, V2), which may adopt a first position, in which the first distributor connects the first coupling opening (V1) with a source of pressurised fluid and the second coupling opening (V2) with a discharge, a second position, in which the first distributor connects the first coupling opening (V1) with said discharge and the second coupling opening (V2) with said source of pressurised fluid, and a central position, in which neither of the two coupling openings is connected to the source of pressurised fluid;

sequence means which, with the first distributor (D1) in the first position, are designed to direct the pressurised fluid to the first supply line (7) until reaching a predetermined pressure and, subsequently, to direct the pressurised fluid to the third supply line (9);

with the first distributor (D1) at the second position, the sequence means are set up to direct the pressurised fluid to the second supply line (8) until reaching a predetermined pressure and, subsequently, to direct the pressurised fluid to the fourth supply line (10).

7. The adjustable fork according to claim 6, comprising:

a fifth supply line (11), which connects the second chamber (C2) of the first actuator (30) with a third coupling opening (V3);

a sixth supply line (12), which connects the second chamber (C2) of the second actuator (40) with a fourth coupling opening (V4)

a second distributor (D2), connected to the third and fourth coupling openings (V3, V4), which may adopt a first position, in which the second distributor connects the third coupling opening (V3) with a source of pressurised fluid and the fourth coupling opening (V4) with a discharge, a second position, in which the second distributor connects the third coupling opening (V3) with said discharge and the fourth coupling opening (V4) with said source of pressurised fluid, and a central position, in which neither of the two coupling openings (V3, V4) is connected to the source of pressurised fluid;

a recirculation duct (13), which connects the first chamber (C1) of the first actuator (30) with the first chamber (C1) of the second actuator (40).

8. The adjustable fork according to claim 7, wherein the third supply line (9) is connected to the recirculation duct (13).

9. The adjustable fork according to claim 6, wherein the fourth supply line (10) comprises a divider (10*a*) from which two branches (101, 102) of the fourth supply line (10) extend, connected respectively to the second chamber (C2) of the first actuator (30) and to the second chamber (C2) of the second actuator (40).

10. The adjustable fork according to claim 9, wherein:

a first branch (101) of the fourth supply line (10) comprises an enabling valve (10*c*), movable between an open position, in which the enabling valve allows a flow along the first branch (101), and a closed position, in which the enabling valve prevents the flow along the first branch (101);

the enabling valve (10*c*) is activated in the closed position by a pressure present in the fifth supply line (11) and in the sixth supply line (12), whilst the enabling valve is activated in the open position by a pressure present in the first branch (101).

11. The adjustable fork according to claim 6, wherein the second supply line (8) comprises a divider (8*a*) from which two branches (81, 82) of the second supply line (8) extend, connected, respectively, to the second chamber (C2) of the third actuator (50) and to the second chamber (C2) of the fourth actuator (60).

12. The adjustable fork according to claim 6, wherein the first and second actuators (30, 40) are aligned with each other and connected at one end from a side of the respective first chambers (C1), with rods (31, 41) of the first and second actuators (30, 40) facing on opposite sides.

13. The adjustable fork according to claim 12, wherein the first and the second actuators (30, 40) are connected to the main frame (2); the rod (31) of the first actuator (30) is connected to the first slider (3); the rod (41) of the second actuator (40) is connected to the second slider (4).

14. An adjustable fork, comprising:

a main frame (2);

a first and a second prong (5, 6), associated with the main frame (2);

a first slider (3) and a second slider (4), associated with the main frame (2);

the first slider (3) is slidable along an adjustment direction (X) away from and towards the second slider (4) for a predetermined adjustment stroke of the first slider (3);

the second slider (4) is slidable along the adjustment direction (X) away from and towards the first slider (3) for a predetermined adjustment stroke of the second slider (4);

the first prong (5) is associated with the first slider (3) and is slidable, relative to the first slider (3), along the adjustment direction (X) for a predetermined adjustment stroke of the first prong (5);

the second prong (6) is associated with the second slider (4) and is slidable, relative to the second slider (4), along the adjustment direction (X) for a predetermined adjustment stroke of the second prong (6);

a first actuator (30), connected to the first slider (3) and designed for determining the adjustment stroke of the first slider (3);

a second actuator (40), connected to the second slider (4) and designed for determining the adjustment stroke of the second slider (4);

wherein the first prong (5) is slidable on the first slider (3) such that the first prong (5) is slidable in front of the first actuator (30);

wherein the second prong (6) is slidable on the second slider (4) such that the second prong (6) is slidable in front of the second actuator (40).

15. An adjustable fork, comprising:

a main frame (2);

a first and a second prong (5, 6), associated with the main frame (2);

a first slider (3) and a second slider (4), associated with the main frame (2);

the first slider (3) is slidable along an adjustment direction (X) away from and towards the second slider (4) for a predetermined adjustment stroke of the first slider (3);

the second slider (4) is slidable along the adjustment direction (X) away from and towards the first slider (3) for a predetermined adjustment stroke of the second slider (4);

the first prong (5) is associated with the first slider (3) and is slidable, relative to the first slider (3), along the adjustment direction (X) for a predetermined adjustment stroke of the first prong (5);

the second prong (6) is associated with the second slider (4) and is slidable, relative to the second slider (4), along the adjustment direction (X) for a predetermined adjustment stroke of the second prong (6);

an actuator unit (30, 40, 50, 60), designed for determining said adjustment strokes of the first slider, the second slider, the first prong and the second prong;

a control system, connected to the actuator unit (30, 40, 50, 60) and configured for activating the actuator unit in response to at least one widening command and to a narrowing command;

wherein in a presence of an active widening command, the control system determines a moving of the prongs (5, 6) away from each other up to a maximum distance position, followed by a moving away from each other of the sliders (3, 4);

wherein in a presence of an active narrowing command, the control system determines a moving of the prongs (5, 6) towards each other up to a minimum distance position, followed by a moving towards each other of the sliders (3, 4);

a first actuator (30), connected to the first slider (3) and designed for determining the adjustment stroke of the first slider (3);

a second actuator (40), connected to the second slider (4) and designed for determining the adjustment stroke of the second slider (4);

a third actuator (50), connected to the first prong (5) and designed for determining the adjustment stroke of the first prong (5);

a fourth actuator (60), connected to the second prong (6) and designed for determining the adjustment stroke of the second prong (6);

wherein the control system is connected to said actuators (30, 40, 50, 60) and is configured for activating each actuator in response to said widening and narrowing commands;

wherein said actuators (30, 40, 50, 60) are hydraulic actuators, and wherein the control system comprises a hydraulic circuit;

wherein said actuators (30, 40, 50, 60) each comprise a first chamber (C1) and a second chamber (C2), separated from each other by a piston (P), and wherein the control system comprises:

a first supply line (7), which connects the first chamber (C1) of the third and fourth actuators (50, 60) with a first coupling opening (V1);

a second supply line (8), which connects the second chamber (C2) of the third and fourth actuators (50, 60) with a second coupling opening (V2);

a third supply line (9), which connects the first chamber (C1) of the first and second actuators (30, 40) with said first coupling opening (V1);

a fourth supply line (10), which connects the first chamber (C1) of the first and second actuators (30, 40) with said second coupling opening (V2);

a first distributor (D1), connected to the first and second coupling openings (V1, V2), which may adopt a first position, in which the first distributor connects the first coupling opening (V1) with a source of pressurised fluid and the second coupling opening (V2) with a discharge, a second position, in which the first distributor connects the first coupling opening (V1) with said discharge and the second coupling opening (V2) with said source of pressurised fluid, and a central position, in which neither of the two coupling openings is connected to the source of pressurised fluid;

sequence means which, with the first distributor (D1) in the first position, are designed to direct the pressurised fluid to the first supply line (7) until reaching a predetermined pressure and, subsequently, to direct the pressurised fluid to the third supply line (9);

with the first distributor (D1) at the second position, the sequence means are set up to direct the pressurised fluid to the second supply line (8) until reaching a predetermined pressure and, subsequently, to direct the pressurised fluid to the fourth supply line (10).

* * * * *